United States Patent
Dietrich

(10) Patent No.: US 6,322,869 B1
(45) Date of Patent: Nov. 27, 2001

(54) COMBINED POLYSTYRENE AND POLYURETHANE VACUUM INSULATING PANEL AND THE USE THEREOF FOR PRODUCING INSULATING ELEMENTS

(75) Inventor: Karl Werner Dietrich, Odenthal-Osenau (DE)

(73) Assignee: Bayer Aktiengesellschaft, Leverkusen (DE)

(*) Notice: Subject to any disclaimer, the term of this patent is extended or adjusted under 35 U.S.C. 154(b) by 0 days.

(21) Appl. No.: 09/446,297

(22) PCT Filed: Jun. 19, 1998

(86) PCT No.: PCT/EP98/03743

§ 371 Date: Dec. 18, 1999

§ 102(e) Date: Dec. 18, 1999

(87) PCT Pub. No.: WO98/59194

PCT Pub. Date: Dec. 30, 1998

(30) Foreign Application Priority Data

Jun. 24, 1997 (DE) .............................................. 197 26 732

(51) Int. Cl.$^7$ ..................................................... B32B 5/18
(52) U.S. Cl. ................................. 428/69; 428/76; 428/71
(58) Field of Search .................................. 428/69, 71, 76, 428/316.6; 52/406.2

(56) References Cited

U.S. PATENT DOCUMENTS 5,273,801 * 12/1993 Barry et al. ............................ 428/69

* cited by examiner

*Primary Examiner*—Alexander S. Thomas
(74) *Attorney, Agent, or Firm*—Joseph C. Gil; Lyndanne M. Whalen

(57) ABSTRACT

A vacuum panel composed of two foam slabs positioned one on top of the other which slabs are covered with a film in which the panel has been evacuated and sealed with a gas-tight seal. One of the foam slabs is an open-pored polystyrene foam. The other foam slab is an open-pored polyurethane foam. These vacuum insulating panels are useful for the production of insulating elements that are used as external walls in refrigerators.

11 Claims, 4 Drawing Sheets

COMBINED POLYSTYRENE AND POLYURETHANE VACUUM INSULATING PANEL AND THE USE THEREOF FOR PRODUCING INSULATING ELEMENTS

This invention relates to a combined vacuum insulating panel consisting of slabs of polyurethane and polystyrene, and the use thereof in the production of insulating elements of the type used, for example, as external walls in refrigeration equipment.

It is known that vacuum insulating panels are produced from a porous material and a gas-tight film covering it on all sides, with evacuation of the "cavity" formed by the porous material. The porous material may consist either of a porous bulky substance or else of a rigid foam. The film usually consists of combinations of several layers, the various layers fulfilling different tasks, such as a diffusion barrier to various gases and mechanical strengthening.

Vacuum insulating panels are of great interest as insulating material, particularly in the refrigeration industry.

Of particular interest as vacuum insulating panels are open-pored foams such as, for example, polyurethane foam and polystyrene foam as well as their comminuted products bound together to form a slab, such as are described, for example, in WO 96/14207.

Figure 1:
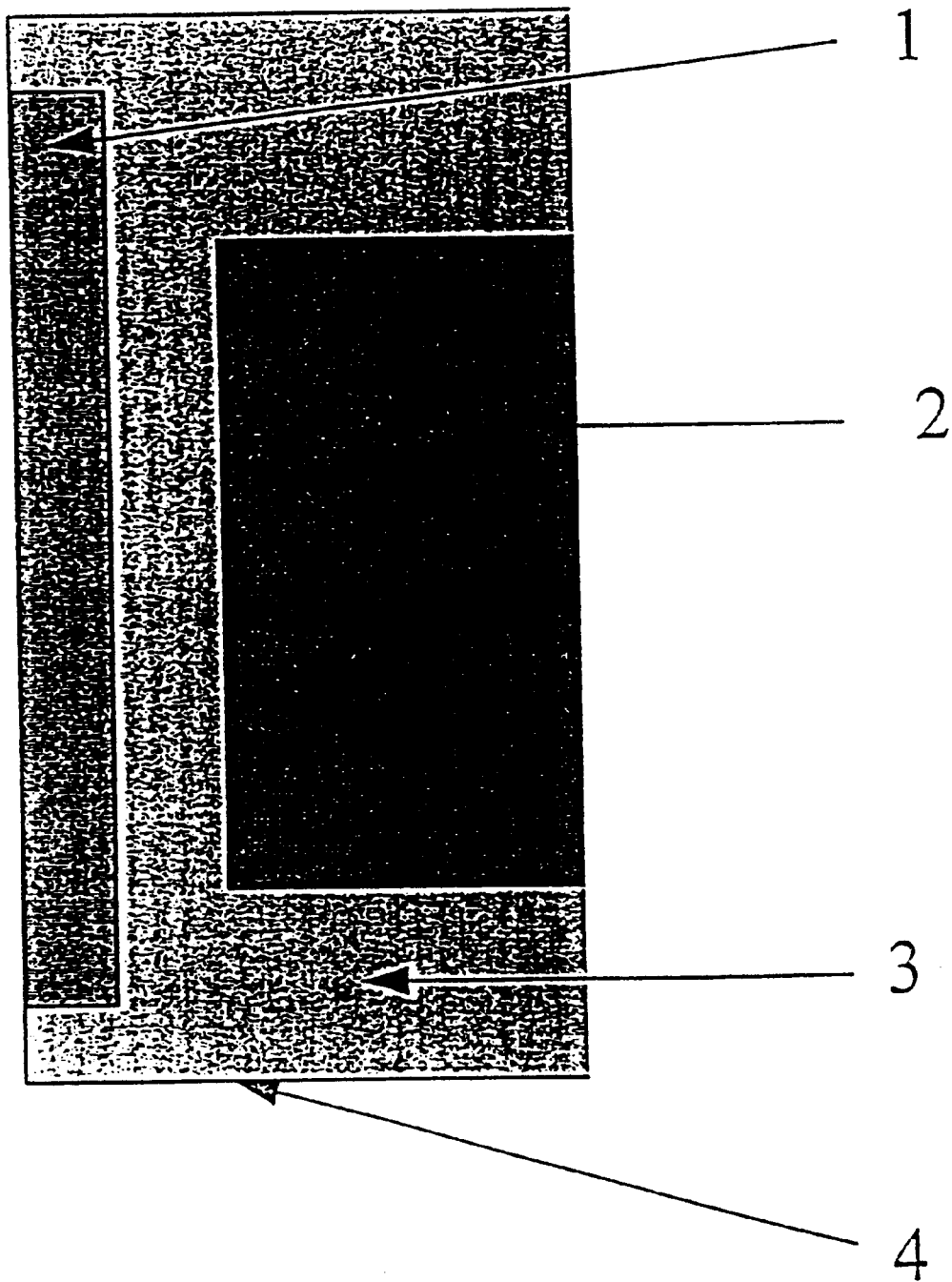

Usually the vacuum insulating panels are combined with rigid polyurethane foam in such a way that the vacuum insulating panels are attached on one side to a cover, for example, the external metal sheet of a refrigerator, and the remaining cavity is foamed with rigid polyurethane foam (cf. FIG. 1).

Here—in particular at large foam thicknesses—temperatures of up to 180° C. occur. On the side of the vacuum insulating panel nearer to the foam, temperatures of up to 150° C. can occur. Such temperatures are above the heat distortion temperature of the covering films used; even polystyrene foam used as filler for vacuum insulating panels melts at such temperatures. But it is especially the open-pored, microcellular polystyrene foam which is of particular interest in insulation technology as filler for vacuum insulating panels.

Accordingly, the object of the present invention was to render possible the use of temperature-sensitive polystyrene slabs in combination with polyurethane foam as insulating material.

Surprisingly, it has now been found that combination vacuum insulating panels which are stable at the foaming temperature are obtained when the open-pored polystyrene foam is covered with a layer of open-pored polyurethane foam and then covered with film, evacuated and sealed. If this combination element is constructed so that the polystyrene side is nearer to the external cover and the polyurethane side is nearer to the foam filling out the remaining cavity, then it survives the foaming process during the production of an insulating element regardless.

It is particularly surprising that the surface temperature of the vacuum insulating panel is also lowered on the side being foamed when a polyurethane foam having a density of more than 50 kg/m$^2$, or a slab made of comminuted rigid foam bound together, as disclosed in WO 96/14207, is used in the vacuum insulating panel.

The present invention accordingly provides a vacuum insulating panel consisting of a) two foam slabs laid flat on top of one another, one slab consisting of open-pored polystyrene foam and the other slab consisting of open-pored polyurethane foam, b) a film covering both slabs, which has been evacuated and sealed with a gas-tight seal.

The two slabs are usually only laid loosely on top of one another during the production, because the mechanical stability of the vacuum insulating panel according to the invention is provided by the covering of film and subsequent evacuation, so that it is unnecessary to bond the two slabs together. But they may be bonded together or attached to one another at certain points or along strips.

The polystyrene slab consists of open-cell, for example, extruded polystyrene foam having a density of 20 to 60 kg/m$^3$, preferably 25 to 45 kg/m$^3$. The average cell size is preferably $\leq 50$ μm.

The polyurethane slab may consist of an open-cell, preferably microcellular, polyurethane foam having a density of >50 kg/m$^3$, preferably >80 kg/m$^3$, for example, 80 to 200 kg/m$^3$.

Preferably a slab made of particles of rigid polyurethane foam bound together, such as is described, for example, in WO 96/14207, is used as polyurethane slab. Here the density of the polyurethane slab is from 100 to 350 kg/m$^3$, preferably 150 to 250 kg/m$^3$. Where a slab made of particles of rigid polyurethane foam bound together is used, it is also preferred that the particulate rigid polyurethane foam be a recycled material, preferably a particulate rigid polyurethane foam from the recycling of old refrigerators, the polyurethane foam powder or flakes have a particle size of from 0.01 to 5 mm, preferably 0.1 to 2 mm, particularly preferably 0.1 to 1 mm, the binder used to produce the polyurethane slab be a diisocyanate or polyisocyanate (preferably mixtures of diphenylmethane diisocyanates and polyphenyl polymethylene polyisocyanates).

All known gas-tight films, for example, combination films, of the type also used for the production of commercially available vacuum panels of existing prior art, are suitable for the vacuum panel produced according to the invention. Examples which may be mentioned are: a combination of polyethylene film with polyvinyl alcohol film, polyethylene film with aluminium foil and optionally polyester film or polyester-amide film. Multilayered films wherein one layer is an aluminium foil are preferred. The most preferred thickness of the aluminium foils is between 5 and 9 μm.

Prior to their being covered with film and evacuated, the foam slabs can be cut, or appropriate indentations can be cut out for the installation of switches, wiring or ducts.

Figure 2:
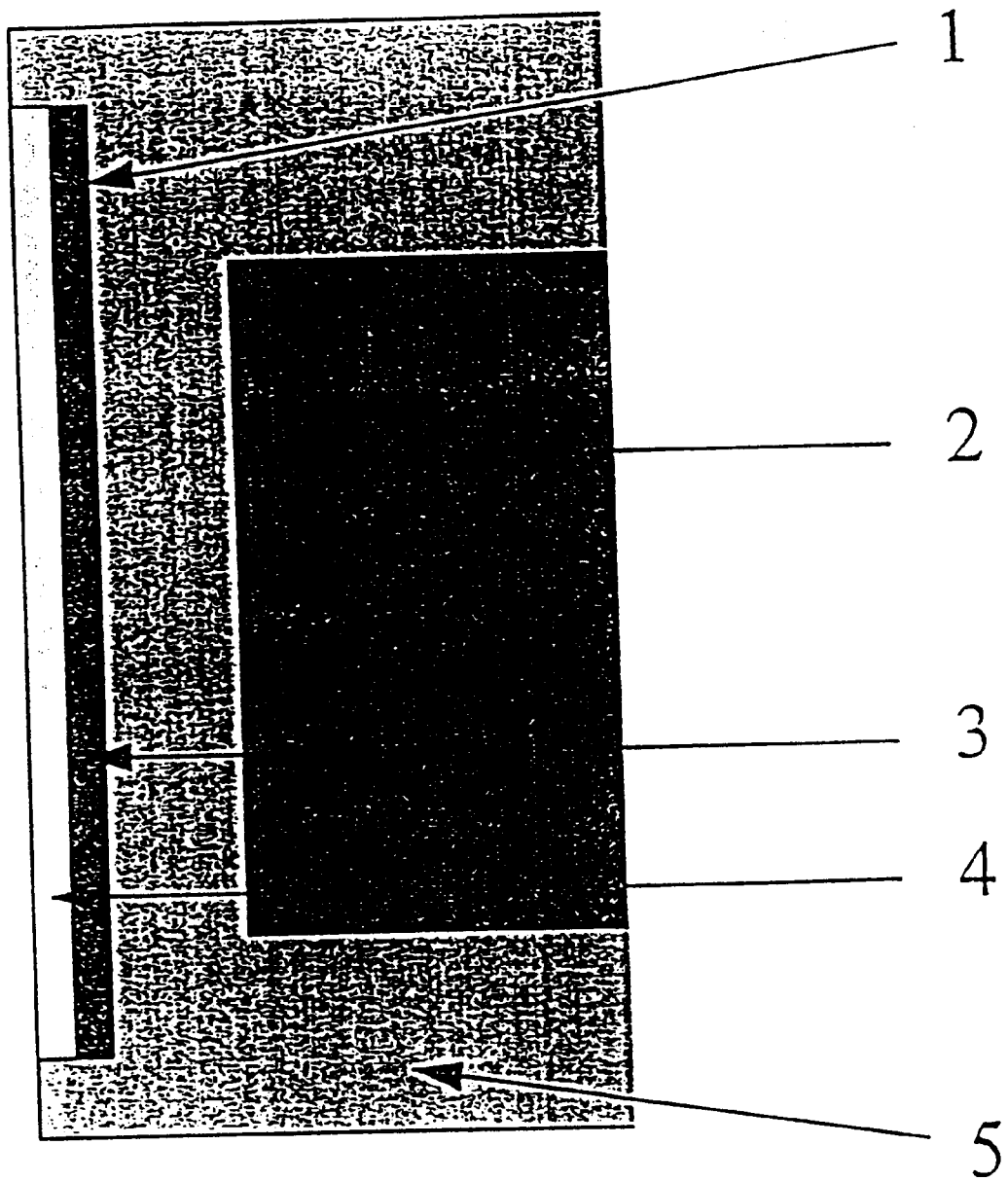

The invention also provides the use of the vacuum insulating panels described above for the production of insulating elements made of polyurethane plastics, such as are used, for example, as structural elements for refrigeration equipment, in particular refrigerators or freezers. Here the vacuum insulating panel is incorporated into the insulating element in such a way that the polystyrene side is nearer to the outside and the polyurethane side is nearer to the polyurethane foam which is contained in the insulating element and fills out the remainder of the insulating volume. For the purpose of clarification, such an arrangement is illustrated in FIG. 2.

The following Examples are intended to explain the invention in more detail, but not thereby to limit its scope.

FIGURES

Figure 3:
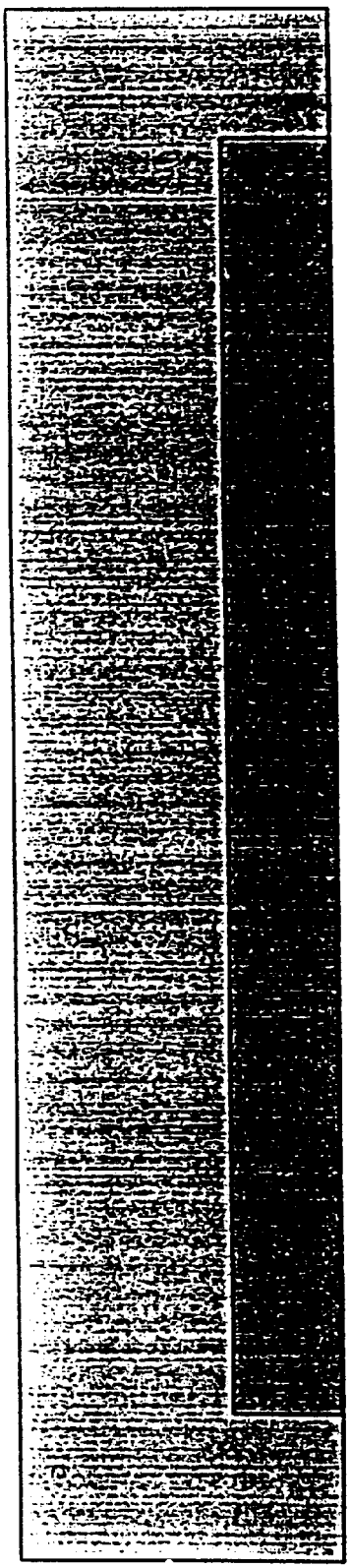

FIG. 1 Insulating element for a refrigerator with a polyurethane vacuum insulating panel according to prior art 1: Vacuum insulating panel 2: Internal container of refrigerator 3: Polyurethane foam which foams the remaining volume 4: External wall of refrigerator FIG. 2 Insulating element for a refrigerator with a vacuum insulating panel according to the invention 1: Cooling film of vacuum insulating panel 2: Internal container of refrigerator 3: Slab of open-pored polyurethane foam 4: Slab of open-pored polystyrene foam 5: Polyurethane foam which foams the remaining volume FIG. 3 Illustration of Example 2

Figure 4:
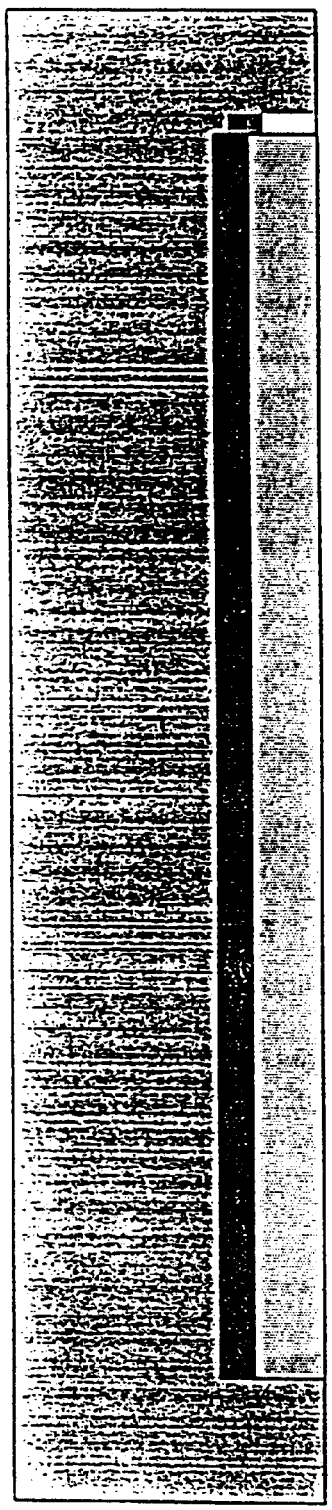

FIG. 4 Illustration of Example 4

EXAMPLES

Comparison Example 1

A cavity of 500×800×70 mm in size was foamed with a rigid polyurethane foam having the bulk density 35 kg/m$^3$, as is usual commercially for the foaming of refrigeration equipment. A maximum temperature of 170° C. was measured in the core during the foaming process.

Comparison Example 2

A vacuum insulating panel made of open-pored rigid PU foam (density: 40 kg/m$^3$) of 600×400×30 mm in size was inserted centrically into an insulating element for a refrigerator (side wall) in such a way that it was fixed to the lower part of the cover (FIG. 3). The remaining cavity was foamed with rigid PU foam as in Example 1. During the foaming process, temperatures of 120° C. to 140° C. were measured on the side of the film surface nearer to the foam.

Comparison Example 3

A vacuum insulating panel with open-pored polystyrene foam as filler was inserted as in Example 2. Approximately 5 to 10 mm of the core layer was damaged/compressed as a result of the foaming temperature.

Example 4—according to the invention a) Production of the polyurethane slab 580 g of a particulate rigid PU foam obtained from a refrigerator recycling plant, together with 20 g water and 58 g of a polyisocyanate mixture of diphenylmethane diisocyanates and polyphenyl polymethylene polyisocyanates Desmodur® VP PU 1520 A20; Bayer AG), were evenly mixed in a Lödige ploughshare mixer with two-fluid nozzles. This mixture was placed in a holding block and from it a moulding of 600×400 mm in size was formed, simultaneously compacted and then, in a laboratory press under a pressure of 5 bar and at a temperature of 120° C., was compressed to 20 mm for 8 minutes, with the aid of a time-measuring program.

A porous slab having a thickness of 20 mm and a bulk density of 200 kg/m$^3$ was obtained from this. The slab was heated at 120° C. for approximately 2 hours, in order to free it of all volatile constituents.

b) Production of the combined vacuum insulating panel from polystyrene foam and polyurethane foam A slab of open-pored polystyrene (600×400×20 mm) was laid flat on the polyurethane slab produced in a) and covered with a film consisting of the layers polyethylene/polyvinyl alcohol/polyethylene and evacuated to 0.5 mbar. The edges of the film were sealed under vacuum.

c) Insertion of the vacuum insulating panel into an insulating element for a refrigerator A vacuum insulating panel is inserted into an insulating element for a refrigerator (side wall) in such a way that the polyurethane side of the panel is nearer to the side foamed with rigid polyurethane foam (FIG. 4). Temperatures of 80° C. to 90° C. were measured at the film surface of the panel.

What is claimed is:

1. A vacuum insulating panel composed of
   a) two foam slabs laid flat one on top of the other, one slab composed of open-pored polystyrene foam and the other slab composed of open-pored polyurethane foam, having
   b) a film covering both slabs, which panel has been evacuated and sealed with a gas-tight seal.

2. The vacuum insulating panel of claim 1 in which the polystyrene foam slab has a density within the range of 20 to 60 kg/m$^3$.

3. The vacuum insulating panel of claim 2 in which the polyurethane slab has a density of greater than 50 kg/m$^3$.

4. The vacuum insulating panel of claim 3 in which the covering film b) is a multilayered film.

5. The vacuum insulating panel of claim 2 in which the polyurethane slab is composed of particles of rigid polyurethane foam bound together and having a density of from 100 to 350 kg/m$^3$.

6. The vacuum insulating panel of claim 5 in which the covering film b) is a multilayered film.

7. The vacuum insulating panel of claim 1 in which the polyurethane slab has a density of >50 kg/m$^3$.

8. The vacuum insulating panel of claim 1 in which the polyurethane slab is made up of particles of rigid polyurethane foam bound together, having a density within the range of 100 to 350 kg/m$^3$.

9. The vacuum insulating panel of claim 1 in which the covering film b) is a multilayered film.

10. An insulating element produced from the vacuum insulating panel of claim 1.

11. The insulating element of claim 10 in which the vacuum insulating panel is incorporated into the insulating element in such a way that the polystyrene side of the vacuum insulating panel is nearer to the outside and the polyurethane side is nearer to the polyurethane foam which is contained in the insulating element and fills out the remainder of the insulating volume.

* * * * *